(12) United States Patent
Powell

(10) Patent No.: US 7,244,047 B2
(45) Date of Patent: Jul. 17, 2007

(54) DROP-IN HIGH INTENSITY DISCHARGE LAMP ASSEMBLY, AND RETROFIT METHOD OF DEPLOYING SAME

(75) Inventor: John Eddie Powell, Newport, NH (US)

(73) Assignee: Luminescent Systems, Inc., Lebanon, NH (US)

( * ) Notice: Subject to any disclaimer, the term of this patent is extended or adjusted under 35 U.S.C. 154(b) by 174 days.

(21) Appl. No.: 11/010,606

(22) Filed: Dec. 13, 2004

(65) Prior Publication Data

US 2006/0126334 A1 Jun. 15, 2006

(51) Int. Cl.
*B60Q 1/14* (2006.01)
(52) U.S. Cl. ............ 362/263; 362/265; 362/470; 362/659; 313/113
(58) Field of Classification Search ............ 362/257, 362/263, 265, 470, 659; 313/25, 113; 318.11
See application file for complete search history.

(56) References Cited

U.S. PATENT DOCUMENTS 3,040,172 A * 6/1962 Chan ..................... 362/257
4,437,142 A 3/1984 Donato et al.
6,111,359 A * 8/2000 Work et al. ............. 313/25
6,376,992 B1 4/2002 Petrick
6,501,231 B1 12/2002 Hyland et al.
6,781,318 B2 8/2004 Lapatovich et al.

OTHER PUBLICATIONS

U.S. Appl. No. 11/549,975, John Eddie Powell.

* cited by examiner

*Primary Examiner*—Stephen F Husar
(74) *Attorney, Agent, or Firm*—Vincent K. Gustafson; Intellectual Property Technology Law

(57) ABSTRACT

A retrofit HID lamp assembly, for use in a non-HID lighting receptacle, to provide HID illumination. The lamp assembly includes (i) a housing of a non-HID lamp assembly, (ii) a base terminal structure coupled with the housing, and compatible with such non-HID lighting receptacle, (iii) a ballast unit in the interior of the housing, (iv) a reflector overlying the ballast unit in the interior of the housing, (v) an HID lamp mounted in the interior of the housing so that light generated by the HID lamp is reflected by the reflector, with the HID lamp being electrically coupled with the ballast unit, and (vi) a lens coupled with the housing. A corresponding fabrication methodology is described. The retrofit HID lamp assembly may be used to retrofit existing lighting installations, such as PAR receptacles in exterior aircraft lighting systems, to cost-efficiently improve the illumination provided by such systems.

11 Claims, 2 Drawing Sheets

FIG._1

DROP-IN HIGH INTENSITY DISCHARGE LAMP ASSEMBLY, AND RETROFIT METHOD OF DEPLOYING SAME

BACKGROUND OF THE INVENTION

1. Field of Invention

The present invention generally relates to high intensity discharge (HID) lamps and more specifically to a drop-in HID lamp assembly and retrofit method of deploying same, e.g., in aircraft lighting applications.

2. Brief Description of the Related Art

In the field of aircraft lighting, a wide variety of lighting elements and fixtures has been employed for interior (cabin) as well as exterior lighting applications.

Among the lights employed in exterior aircraft lighting systems, landing lights and taxi lights are particularly critical for safety and operability of the aircraft.

Conventional commercial passenger aircraft such as the Boeing 737, 747 and 777 (The Boeing Company, Chicago, Ill.) and many Airbus jetliners (Airbus S.A.S., Toulouse, France) use a common 28 volt 600 watt halogen. Parabolic Aluminized Reflector (PAR) 64 lamp (Part No. Q4559X or Part No. Q4559XX) for landing and taxi lights. In PAR lamps, the bulb and reflector are encased in a glass housing, with size of the lamp ranging from M16 to PAR 64, and bulb sizes ranging from Aircraft Landing (ACL) to very wide. Typical output of PAR lamps for such aircraft lighting applications is in the vicinity of 700,000 candelas (cd) with a 10×12 (spot) angle. A significant deficiency of such PAR 64 lamps is their short service life, which in typical aircraft exterior lighting applications is on the order of 10-20 hours. The failure mode of such lamps is almost invariably associated to cracked lenses or filament failure.

Change-out of failed PAR 64 lamps, as a result of their short operating life, represents a major maintenance issue, since such lighting is intended for continuous functioning during night or low visibility conditions.

There is therefore a need in the art for aircraft taxi and landing lights that provide long service life and are readily deployed and efficient in use, and that, ideally, could be retrofitted to existing PAR 64 lighting assemblies, thereby avoiding the necessity of out-of-service periods for rewiring and fitting of new lighting systems.

SUMMARY OF THE INVENTION

The present invention generally relates to high intensity discharge (HID) lamps and more specifically to a drop-in HID lamp assembly and retrofit method of deploying same, e.g., in aircraft lighting applications.

In one aspect, the invention relates to a retrofit HID lamp assembly, for use in a non-HID lighting receptacle that is constructed and arranged to receive a non-HID lamp assembly to thereby form a lighting installation for the production of light, the retrofit HID lamp assembly including (i) a housing of a non-HID lamp assembly, (ii) a base terminal structure coupled with the housing, and compatible with such non-HID lighting receptacle, (iii) a ballast unit disposed in the interior of the housing, (iv) a reflector overlying the ballast unit in the interior of the housing, (v) an HID lamp mounted in the interior of the housing so that light generated by the HID lamp is reflected by the reflector, with the HID lamp being electrically coupled with the ballast unit, and (vi) a lens coupled with the housing.

In another aspect, the invention relates to a retrofit HID lamp assembly, for use in a PAR 64 lighting receptacle that is constructed and arranged to receive a PAR 64 lamp assembly to thereby form a lighting installation for the production of light, the retrofit HID lamp assembly including (i) a PAR 64 reflector, (ii) a base terminal structure coupled with the housing, and compatible with such PAR 64 lighting receptacle, (iii) a ballast unit disposed in the interior of the housing, (iv) a PAR 46 reflector overlying the ballast unit in the interior of the housing, (v) an HID lamp mounted in the interior of the housing so that light generated by the HID lamp is reflected by the PAR 46 reflector, with the HID lamp being electrically coupled with the ballast unit, and (vi) a lens coupled with the PAR 64 reflector.

A further aspect of the invention relates to a method of fabricating a retrofit HID lamp assembly, for use in a non-HID lighting receptacle that is constructed and arranged to receive a non-HID lamp assembly to thereby form a lighting installation for the production of light, the method including (i) providing a housing of a non-HID lamp assembly, (ii) coupling to the housing a base terminal structure that is compatible with such non-HID lighting receptacle, (iii) disposing a ballast unit in the interior of the housing, (iv) positioning a reflector to overlie the ballast unit in the interior of the housing, (v) mounting an HID lamp in the interior of the housing so that light generated by the HID lamp is reflected by the reflector, (vi) electrically coupling the HID lamp with the ballast unit, and (vi) coupling a lens with the housing.

Yet another aspect of the invention relates to a method of fabricating a retrofit HID lamp assembly, for use in a PAR 64 lighting receptacle, the method including (i) providing a PAR 64 reflector, (ii) coupling to the PAR 64 reflector a base terminal structure that is compatible with the PAR 64 lighting receptacle, (iii) disposing a ballast unit in the interior of the PAR 64 reflector, (iv) positioning a PAR 46 reflector to overlie the ballast unit in the interior of the housing, (v) mounting an HID lamp in the interior of the housing so that light generated by the HID lamp is reflected by the PAR 46 reflector, (vi) electrically coupling the HID lamp with the ballast unit, and (vi) coupling a lens with the housing.

Still another aspect of the invention relates to a method of retrofitting an aircraft lighting system including PAR 64 lamp articles, such method including replacing at least one of the PAR 64 lamp articles with a retrofit HID lamp assembly according to the present invention.

Other aspects, features and embodiments of the invention will be more fully apparent from the ensuing disclosure and appended claims.

DETAILED DESCRIPTION OF THE INVENTIONS AND PREFERRED EMBODIMENTS THEREOF

Figure 1:
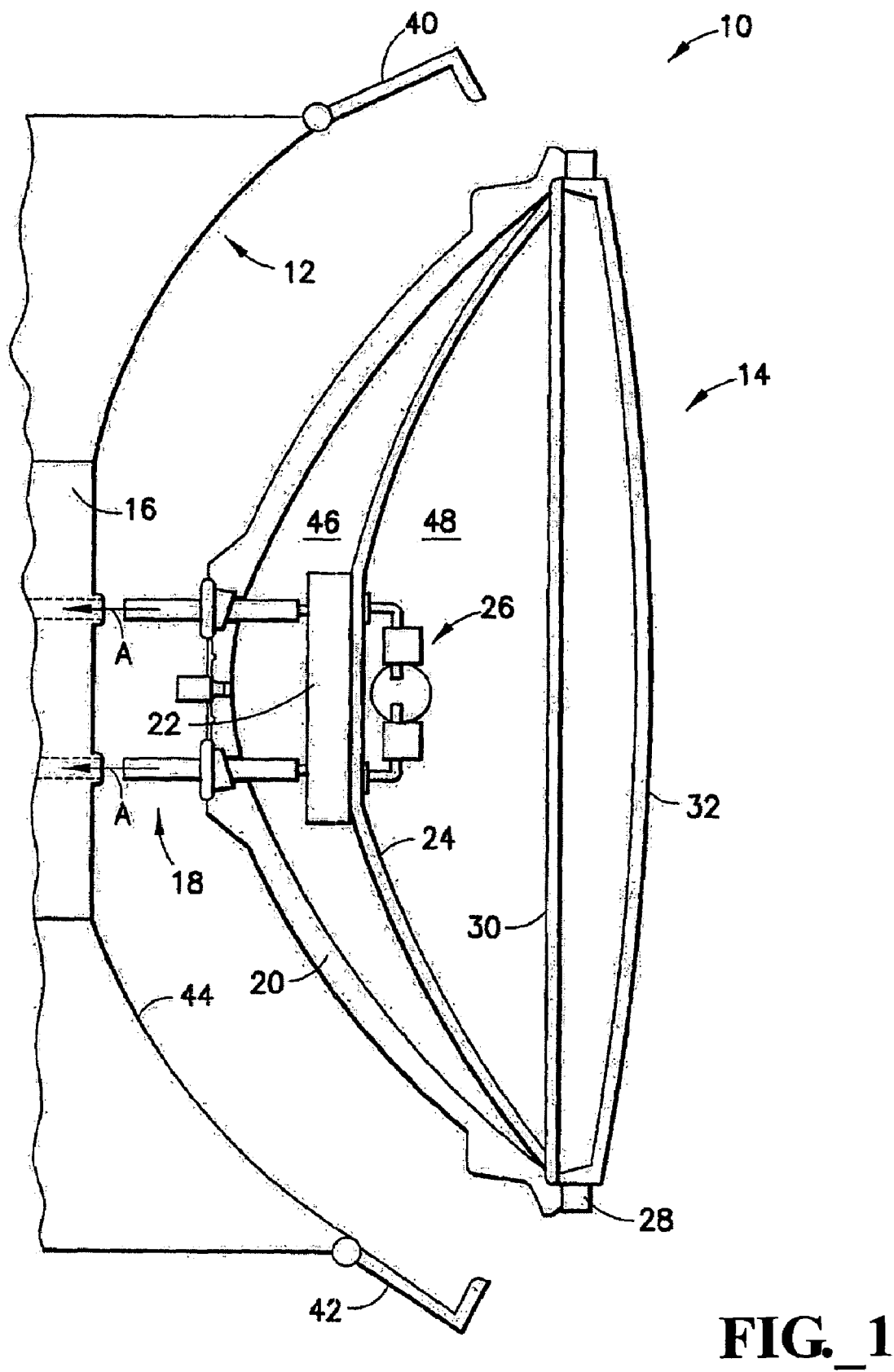
FIG. 1 is a schematic representation of a PAR 64 lighting installation in which a high intensity discharge lamp assembly of the present invention is being mounted.

The present invention generally relates to high intensity discharge (HID) lamps and more specifically to a drop-in HID lamp assembly and retrofit method of deploying same, e.g., in aircraft lighting applications.

The present invention is based on the discovery that HID lamp assemblies can be fabricated as a specific composite of HID lamp and PAR lamp componentry, to constitute a drop-in HID unit that can be substitutionally employed for PAR 64 lamp assemblies in PAR 64 lighting installations, without the need of rewiring and reconstruction of the lighting installation. The HID lamp assembly of the invention is fabricated as a drop-in unit that allows an existing PAR 64 lighting installation to be retrofitted without modification of the aircraft.

The invention takes advantage of the superior operating performance and robust structural character of HID lamps, in comparison to filament-based PAR 64 lamp assemblies. HID lamps have lifetimes exceeding 2000-4000 hours and they contain no filaments. Additionally, the burners of HID lamps are 3-4 times more efficient than incandescent halogen lamps, heat production per unit of light production is substantially lower, and the light beam source is much smaller thereby enabling much better optical control of the light production.

"High intensity discharge (HID) lamps" as such term is used herein, are lamps that produce illumination when an arc of electrical energy is passed across an arc gap in a gaseous medium contained in the lamp. Such lamps typically use a ballast for generating an electrical charge and regulating voltage and current that is passed to the burner, or arc-generation device. Examples of HID lamps include, without limitation, metal halide lamps, compact metal halide lamps, pulse-start metal halide lamps, high pressure sodium lamps, low pressure sodium lamps, white high pressure sodium lamps and mercury vapor lamps.

To utilize an HID lamp in place of a conventional PAR 64 lamp in an exterior lighting installation of an aircraft enables the lighting system to be markedly improved toward the objective of not having to replace PAR lighting at frequent intervals during the service life of the aircraft. The issue with this change, however, is that the HID burner requires a ballast, and there is therefore need of down-time for the aircraft to be re-wired and fitted for this device. The numbers of aircraft currently in service that have exterior PAR lighting systems is very large, however, and such change therefore would require idling of significant numbers of aircraft in order to be upfitted to accommodate HID lamps.

The present invention provides a drop-in replacement HID lamp assembly that is able to be implemented in existing PAR lamp installations, without modification to the aircraft.

This is achieved by a composite lamp assembly that utilizes a PAR 64 outer reflector housing as a shell for the lamp assembly structure having a concave surface defining an interior volume of the housing. An electronic ballast unit is mounted in the housing, e.g., in the interior volume, at an interior portion of the inner surface of the housing, in electrical contact with the base terminal structure of the lamp assembly. A PAR 46 reflector is mounted in the interior volume, overlying the electronic ballast unit. This reflector also has a concave surface, defining a sub-interior volume. An HID lamp unit is mounted in the sub-interior volume of the PAR 46 reflector. A lens is mounted over the PAR 46 reflector and secured to the PAR 64 reflector at a circumferential periphery of the lens, to form an enclosure containing the ballast unit, the PAR 46 reflector and the HID lamp unit.

The base terminal structure of such composite lamp assembly is selected to be identical to that of a PAR 64 Q4559X lamp assembly, so as to be coupleable with the mounting fixture of the aircraft lighting installation.

Such a composite lamp assembly, using a 50 watt HID PAR 46 lighting system, produces a higher light output than a Q4559X halogen lamp.

The invention thereby permits the fabrication, with commercially available components, of a novel retrofit lighting assembly that is compatible with, and readily mounted in, a conventional PAR 64 lamp assembly mounting receptacle of an aircraft exterior lighting system, without modification of the receptacle, wiring or associated on-board circuitry, power supplies, or other features of the existing lighting installation of the aircraft. Additionally, by retrofitting the existing PAR 64 lamp assembly mounting receptacles of the aircraft in such manner, with retrofit HID lamp assemblies of the present invention, the service life of the lamp assemblies in the retrofitted installation is substantially increased, e.g., by as much as two orders of magnitude or more, relative to corresponding lighting installations equipped with conventional PAR 64 lamp assemblies.

FIG. 1 is a schematic representation of a PAR 64 lighting installation 10 in which a high intensity discharge lamp assembly 14 of the present invention is being mounted in a PAR 64 receptacle 12.

The high intensity discharge lamp assembly 14 is a composite lamp assembly that utilizes a PAR 64 outer reflector 20 as a shell or housing for the lamp assembly structure. The outer reflector housing 20 has a concave wall surface defining an interior volume 46 of the housing. An electronic ballast unit 22 is mounted in the housing, e.g., in the interior volume 46, in electrical contact with the base terminal 18 of the lamp assembly. A PAR 46 reflector 24 is mounted in the interior volume 46, overlying the electronic ballast unit 22. The PAR 46 reflector 24 also has a concave wall surface, defining a sub-interior volume 48. An HID lamp unit 26 is mounted in the sub-interior volume 48 of the PAR 46 reflector. A lens 28 including rear wall 30 and front wall 32 is mounted over the PAR 46 reflector 24 and secured to the PAR 64 reflector 20 at a circumferential periphery of the lens 28, to form an enclosure containing the ballast unit 22, the PAR 46 reflector 24 and the HID lamp unit 26.

The high intensity discharge lamp assembly 14 is shown in FIG. 1 as being mounted in a PAR 64 receptacle 12. The receptacle 12 includes a main body 16 defining a substantially concave cavity bounded by the surface 44 and generally conformable with the rear surface profile of the PAR 64 reflector 20. The receptacle 12 includes biased clips 40 and 42, which are pivotally mounted on the main body 16, and serve to positionally maintain the lamp assembly in place once it is installed in the receptacle.

The main body 16 of the receptacle 12 includes openings accommodating the base terminals 18 (shown as being inserted into the receptacle 12, by translation in the direction indicated by arrows A).

It is apparent from the foregoing description that the HID lamp assembly of the present invention provides a retrofittable illumination article that is compatible with a conventional PAR 64 receptacle, such as used in aircraft exterior lighting systems, e.g., for landing lights and taxi lights of the aircraft. No variation or modification of the existing structure of the aircraft is required, and the HID lamp assembly of the invention therefore may immediately be implemented in existing aircraft maintenance operations upon failure of previously installed PAR 64 lamp assemblies. As a result, a substantial increase in subsequent service life of the lighting article is achieved, with concomitant reduction in aircraft out-of-service time, maintenance time requirements, labor cost and maintenance personnel requirements, as compared to operation with a PAR 64 lamp assembly.

Figure 2:
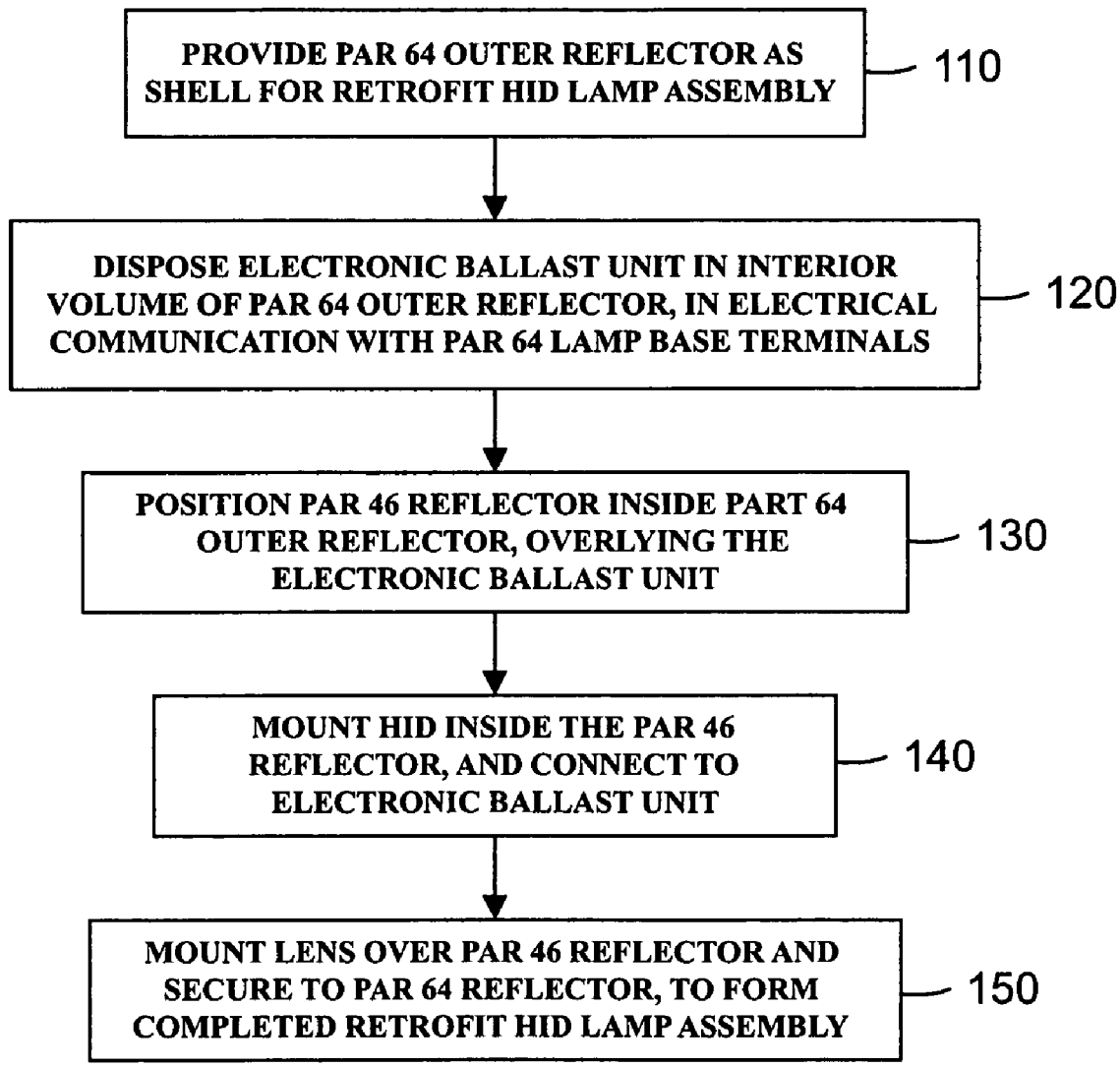
FIG. 2 is a flowsheet illustrating the steps employed for fabricating a retrofit HID lamp assembly of the invention, for use in an existing PAR 64 lighting installation.

FIG. 2 is a flowsheet illustrating the steps employed for fabricating a retrofit HID lamp assembly of the invention, for use in an existing PAR 64 lighting installation.

The first step 110 of the fabricating method involves providing a PAR 64 outer reflector as a shell for the retrofit HID lamp assembly.

In the second step 120, a ballast unit is disposed in the interior volume of the PAR 64 reflector, in electrical communication with PAR 64 lamp base terminals.

Next, in step 130, a PAR 46 reflector, a reflector of smaller size than the PAR 64 reflector, is positioned inside the PAR 64 reflector, overlying the ballast unit.

An HID lamp unit then in step 140 is mounted inside the PAR 46 reflector, and connected to the ballast unit.

Finally, in step 150, a lens is mounted over the PAR 46 reflector and secured to the PAR 64 reflector, to form the completed HID lamp assembly, as a retrofit lighting article suitable for use in PAR 64 receptacles and lighting installations.

The various fabrication steps of the retrofit lighting article manufacture process have been described without reference to specific solders, bondants, adhesives, interconnect structures, couplings and the like, for simplicity of discussion, and the skilled artisan can readily select particular media, materials and mechanical/electrical fasteners without undue experimentation, as may be useful or suggest themselves for the specific application involved. In like manner, the specific HID lamp unit may be selected from among a wide variety of such lamp units, as commercially available.

Additionally, evacuation and sealing of the HID lamp assembly can be carried out during the manufacture of the HID lamp assembly, using vacuum pumps, fusion bonding equipment, and the like, as conventionally used in the manufacture of lighting articles of various types.

While the invention has been described herein in reference to PAR 64 and PAR 46 reflector elements, it will be apparent that the principle of the invention may be implemented in other applications in which a relatively larger and a relatively smaller reflector may be utilized in the disclosed manner, with interconnection of an HID lamp unit to a ballast unit and to the base terminals of a non-HID lamp assembly, to provide a retrofit lighting article substitutionally compatible with existing non-HID lamp assemblies, to obviate the need for reconstruction or modification of existing electrical systems infrastructure.

In such manner, the invention affords a vast array of possible new uses of HID lighting in applications where less efficient non-HID lighting has heretofore been used.

While the invention has been described herein with reference to specific features and illustrative embodiments, it will be recognized that the utility of the invention is not thus limited, but rather extends to and encompasses other features, modifications and alternative embodiments as will readily suggest themselves to those of ordinary skill in the art based on the disclosure and illustrative teachings herein. The claims that follow are therefore to be construed and interpreted as encompassing all such features, modifications and alternative embodiments within their spirit and scope.

What is claimed is:

1. A retrofit HID lamp assembly, for use in a non-HID lighting receptacle that is constructed and arranged to receive a non-HID lamp assembly to thereby form a lighting installation for the production of light, the retrofit HID lamp assembly including:
   (i) a PAR 64 housing compatible in size and shape with the receptacle;
   (ii) a base terminal structure coupled with the housing and adapted to mate with the receptacle;
   (iii) a ballast unit disposed in the interior of the housing;
   (iv) a PAR 46 reflector overlying the ballast unit in the interior of the housing;
   (v) an HID lamp electrically coupled with the ballast unit and mounted in the interior of the housing so that light generated by the HID lamp is reflected by the PAR 46 reflector; and
   (vi) a lens coupled with the housing.

2. The retrofit HID lamp assembly of claim 1 wherein the receptacle is a PAR receptacle.

3. The retrofit HID lamp assembly of claim 1 wherein the receptacle is a PAR 64 receptacle.

4. The retrofit HID lamp assembly of claim 1 wherein the HID lamp comprises a metal halide lamp.

5. A method of retrofitting an aircraft lighting system including PAR 64 lamp articles, such method including replacing at least one of the PAR 64 lamp articles with a retrofit HID lamp assembly according to claim 1.

6. A retrofit HID lamp assembly, for use in a PAR 64 lighting receptacle that is constructed and arranged to receive a PAR 64 lamp assembly to thereby form a lighting installation for the production of light, the retrofit HID lamp assembly including (i) a housing comprising a PAR 64 reflector, (ii) a base terminal structure coupled with the housing, and compatible with such PAR 64 lighting receptacle, (iii) a ballast unit disposed in the interior of the housing, (iv) a PAR 46 reflector overlying the ballast unit in the interior of the housing, (v) an HID lamp mounted in the interior of the housing so that light generated by the HID lamp is reflected by the PAR 46 reflector, with the HID lamp being electrically coupled with the ballast unit, and (vi) a lens coupled with the housing.

7. A method of retrofitting an aircraft lighting system including PAR 64 lamp articles, such method including replacing at least one of the PAR 64 lamp articles with a retrofit HID lamp assembly according to claim 6.

8. A method of fabricating a retrofit HID lamp assembly, for use in a non-HID lighting receptacle that is constructed and arranged to receive a non-HID lamp assembly to thereby form a lighting installation for the production of light, the method including the steps of:
   (i) providing a PAR 64 housing
   (ii) coupling to the housing a base terminal structure that is adapted to mate with such the receptacle;
   (iii) positioning a ballast unit in the interior of the housing;
   (iv) positioning a PAR 46 reflector to overlie the ballast unit in the interior of the housing;
   (v) mounting an HID lamp in the interior of the housing so that light generated by the HID lamp is reflected by the PAR 46 reflector;
   (vi) electrically coupling the HID lamp with the ballast unit; and
   (vi) coupling a lens with the housing.

9. The method of claim 8, wherein the HID lamp comprises a metal halide lamp.

10. A method of fabricating a retrofit HID lamp assembly, for use in a PAR 64 lighting receptacle, the method including (i) providing a PAR 64 reflector, (ii) coupling to the PAR 64 reflector a base terminal structure that is compatible with the PAR 64 lighting receptacle, (iii) disposing a ballast unit in the interior of the PAR 64 reflector, (iv) positioning a PAR 46 reflector to overlie the ballast unit in the interior of the housing, (v) mounting an HID lamp in the interior of the housing so that light generated by the HID lamp is reflected by the PAR 46 reflector, (vi) electrically coupling the HID lamp with the ballast unit, and (vi) coupling a lens with the housing.

11. The method of claim 10, wherein the HID lamp comprises a metal halide lamp.

* * * * *

UNITED STATES PATENT AND TRADEMARK OFFICE
CERTIFICATE OF CORRECTION

PATENT NO. : 7,244,047 B2
APPLICATION NO. : 11/010606
DATED : July 17, 2007
INVENTOR(S) : John Eddie Powell It is certified that error appears in the above-identified patent and that said Letters Patent is hereby corrected as shown below:

Column 1, line 21: "600 watt halogen. Parabolic" should be -- 600 watt halogen Parabolic --.

Column 4, line 19: "Interior volume 46 , in" should be -- interior volume 46, in --.

Column 4, line 21: "interior volume 46 , in" should be -- interior volume 46, in --.

Signed and Sealed this

Twenty-third Day of October, 2007

JON W. DUDAS
*Director of the United States Patent and Trademark Office*